Figure 1:
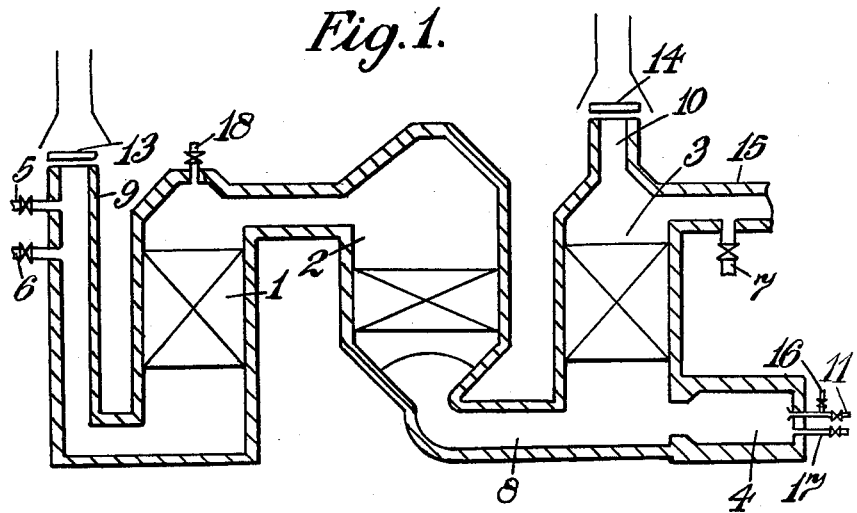

United States Patent Office 2,923,609
Patented Feb. 2, 1960

2,923,609

GAS-MAKING PROCESS

Wilfred Hartley, London, England, assignor to Humphreys & Glasgow Limited, London, England, a British company Application November 9, 1956, Serial No. 621,395

Claims priority, application Great Britain October 22, 1956

1 Claim. (Cl. 48—214)

The invention is concerned with gas-making plant of the kind used for carrying out a cyclic gas-making process from fluid fuels involving gas-making phases, and alternating therewith, plant-heating phases during which heating fuel is burnt in a combustion chamber and, simultaneously with the burning of the fuel or separately, air is blown through the plant for the purpose of burning carbon deposited therein during the gas-making phases. In such plants the heat produced by combustion of the carbon, together with that produced by combustion of the fuel in the combustion chamber, is employed for the heating of the plant. The air may be blown throughout the plant-heating phases whereas fuel may be burnt during only a part of these phases.

Heretofore the combustion chamber has commonly formed part of the main gas path through the plant. Thus it has been swept by and cooled down by gases during the gas-making phase and by at least part of the air required for combustion of carbon deposits during the plant-heating phase. This results in chilling of hot brickwork surfaces in the combustion chamber which would otherwise provide a ready and unfailing source of ignition for the heating fuel injected during plant-heating phases and therefore special ignition appliances have to be employed and relied on. Also a combustion chamber forming part of the main gas path through the plant adds to the amount of space requiring to be purged between the gas-making and plant-heating phases.

A known form of oil gas apparatus is provided with a combustion chamber adjoining two other vessels each of which contains a bed of catalyst arranged between two heat regenerative masses, and in this apparatus gas-making fluid hydrocarbons and steam do not pass through the said combustion chamber. The known apparatus, however, still has the disadvantage that in addition to the air for combustion of the plant heating fuel all the excess air needed for combustion of carbon deposits is also introduced via the combustion chamber with a resultant loss of heat from the walls of the said chamber.

It is an object of this invention to avoid or further reduce heat loss from the walls of the combustion chamber and to reduce the amount of space requiring to be purged between the gas-making and plant-heating phases of the cycle.

According to the invention a gas-making plant of the kind described is characterised in that the combustion chamber comprises a recess in the wall of a vessel or conduit providing part of the main gas path through the plant for gases and vapours during gas-making and plant-heating and carbon burning phases, whereby the combustion chamber is not swept by gases or vapour during gas-making phases nor by carbon-burning air during plant-heating phases.

In gas-making plant (e.g. for making oil gas) having a gas-making chamber and a heat regenerator connected in series and in which during gas-making phases make gas from the gas-making chamber passes through the regenerator and during plant-heating phases air is passed through the regenerator and then through the gas-making chamber, it has been usual to provide a combustion chamber in the regenerator end of the gas-making chamber or in the gas-making chamber end of the regenerator and in each case the combustion chamber has formed part of the main gas path during both plant-heating and gas-making phases. In accordance with the present invention, however, the combustion chamber comprises a recess in the wall of the gas-making chamber at the regenerator end thereof, or a recess in the wall of the regenerator at the gas-making chamber end thereof, or a recess in a conduit between the gas-making chamber and the regenerator. Thus the combustion chamber is set back from the main gas path and is not swept and cooled down by the make gas or by the excess air during plant-heating phases.

Figure 2:
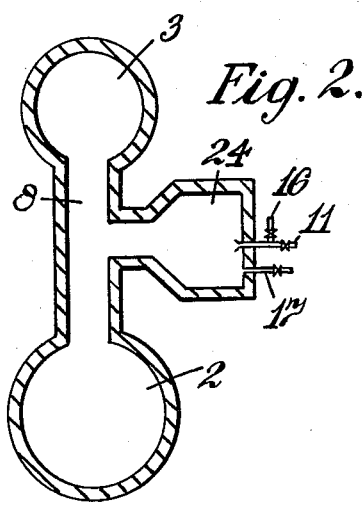

Two specific examples of gas-making plant according to the invention will now be described with reference to the accompanying diagram, in which:

Figure 1 represents a section through one form of plant for the production of oil gas, and Figure 2 represents a sectional plan of another form of plant.

In the example shown in Figure 1 the combustion chamber 4 is arranged at the base of an air preheating regenerator 3. During plant-heating phases fuel (fuel oil or tar) supplied to a burner in the chamber 4 through a valved inlet 11 and atomised by steam or air supplied through 16, is combusted in 4, primary air being supplied through the valved inlet 17. The main air supply for dilution of the combustion gases and for burning the carbon deposits in the plant is supplied from a blower through the valved inlet 7 and is preheated during its passage through the checkers in regenerator 3.

The plant-heating gases pass from regenerator 3 upwards through the catalyst chamber 2 and down through the checkers in a regenerator 1. Here heat is stored for use in preheating steam in the succeeding gas-making phase of the cycle. The plant-heating gases leave regenerator 1 via the open stack valve 13 of stack 9.

Valved air inlet 6 is provided for use in the event that, during part of a plant heating phase, carbon-burning air is to be blown in the reverse direction through the plant, the products of combustion leaving via stack 10 and valve 14.

Valved inlet 5 is for steam supply during the gas-making phase when the direction of gas flow through the apparatus is from left to right through the vessels 1, 2 and 3 in series. Gas-making oil is then sprayed onto the checkers in regenerator 1 via spraying means 18 and the gas produced in the gas-making chamber 2 from the mixture of steam and hydrocarbon vapours passes through outlet 15 to ancillary plant for cooling, cleaning and purification.

Figure 2 shows an alternative arrangement in which the combustion chamber 24 is arranged as a branch from the gas connection 8 between the base of regenerator 3 and the base of the catalyst vessel 2.

I claim:

A cyclic gas-making process for making combustion gas in which gas-making phases alternate with plant-heating phases consisting of the steps of causing gas-making fluids and make gas to flow by a main gas path through a gas-making chamber during the gas-making phase, and during the plant-heating phase producing hot combustion products in a combustion chamber outside of the main gas path, introducing said hot combustion products into the main gas path, introducing air through a regenerator into the main gas path at a point spaced upstream from the point of introduction of the hot combustion products, mixing said air with the hot combustion products outside of the combustion chamber and after the hot combustion products have been introduced into the main gas path, and causing said air and hot combustion products mixture to flow through the gas-making chamber.

References Cited in the file of this patent

UNITED STATES PATENTS

| | | |
|---|---|---|
| 874,537 | Potter | Dec. 24, 1907 |
| 1,828,830 | Crowley | Oct. 27, 1931 |
| 2,205,554 | Brandegee et al. | June 25, 1940 |
| 2,354,324 | Longenecker | July 25, 1944 |
| 2,605,176 | Pearson | July 29, 1952 |
| 2,734,811 | Totzek et al. | Feb. 14, 1956 |